United States Patent
Wang et al.

(10) Patent No.: US 7,327,882 B2
(45) Date of Patent: Feb. 5, 2008

(54) METHOD AND DEVICE FOR CHARACTER LOCATION IN IMAGES FROM DIGITAL CAMERA

(75) Inventors: Kongqiao Wang, Beijing (CN); Jan Kangas, Tampere (FI)

(73) Assignee: Nokia Corporation, Espoo (FI)

( * ) Notice: Subject to any disclaimer, the term of this patent is extended or adjusted under 35 U.S.C. 154(b) by 534 days.

(21) Appl. No.: 10/139,213

(22) Filed: May 7, 2002

(65) Prior Publication Data
US 2003/0035580 A1 Feb. 20, 2003

(30) Foreign Application Priority Data
Jun. 26, 2001 (EP) .................................. 01115390

(51) Int. Cl.
*G06K 9/00* (2006.01)
*G06K 9/34* (2006.01)

(52) U.S. Cl. ...................................... 382/181; 382/173
(58) Field of Classification Search ................ 382/181, 382/173
See application file for complete search history.

(56) References Cited

U.S. PATENT DOCUMENTS

| | | | | |
|---|---|---|---|---|
| 5,245,679 A | * | 9/1993 | Rosenberg | .................... 382/232 |
| 5,410,613 A | * | 4/1995 | Suzuki | ........................ 382/159 |
| 5,651,077 A | * | 7/1997 | Dong et al. | ................. 382/172 |
| 5,768,413 A | * | 6/1998 | Levin et al. | ................ 382/173 |
| 5,818,978 A | * | 10/1998 | Al-Hussein | .................. 382/296 |
| 6,035,059 A | * | 3/2000 | Kurosawa et al. | .......... 382/164 |
| 6,148,092 A | * | 11/2000 | Qian | ........................... 382/118 |
| 6,157,738 A | * | 12/2000 | Wang | .......................... 382/199 |
| 2003/0103671 A1 | * | 6/2003 | Matsuura | ..................... 382/173 |

FOREIGN PATENT DOCUMENTS

EP 0 748 110 A2 12/1996
EP 0 811 946 A2 12/1997

OTHER PUBLICATIONS

Drivas et al: "Page Segmentation and Classification Utilising A Bottom-up Approach" Document Analysis and Recognition, 1995., Proceedings of the Third International Conference on Montreal, Que., Canada Aug. 14-16, 1995,□□Los Alamitos, CA, USA, Comput. Soc, US. Aug. 14, 1995, pp. 610-614, XPO10231121 ISBN: 0-8186-7128-9.*

(Continued)

*Primary Examiner*—Bhavesh M Mehta
*Assistant Examiner*—Jonathan Schaffer
(74) *Attorney, Agent, or Firm*—Foley and Lardner LLP

(57) ABSTRACT

The invention is a method for locating characters in digital images, using an image layering process. The method includes the transforming the digital data of the digital image into normalized digital color image data and into digital grayscale image data; discarding redundant components of the normalized digital color image data and/or the digital grayscale image data; generating binary image layers from the non-discarded grayscale and normalized color image data according to a layering process; and using a recognition algorithm on the binary image layers to recognize connected components that can represent characters or part of characters contained in the digital image.

35 Claims, 3 Drawing Sheets

A color or grayscale image.
Each small square represents a pixel.

OTHER PUBLICATIONS

Jiangying Zhou Lopresti et al: "Extracting Text From WWW Images" Proceedings of the 4th International Conference on Document Analysis and Recognition. (ICDAR). ULM, Germany, Aug. 18-20, 1997, Proceedings of the ICDAR, Los Alamitos, IEEE Comp., Soc., US, vol. II, Aug. 18, 1997, pp. 248-252, XPO10244719 ISBN: 0-8186-7898-4.

Drivas et al: " Page Segmentation and Classification Utilising A Bottom-Up Approach" Document Analysis and Recognition, 1995., Proceedings of the Third International Conference on Montreal, Que., Canada Aug. 14-16, 1995, Los Alamitos, CA, USA, IEEE Comput. Soc, US. Aug. 14, 1995, pp. 610-614, XPO10231121 ISBN: 0-8186-7128-9.

* cited by examiner

METHOD AND DEVICE FOR CHARACTER LOCATION IN IMAGES FROM DIGITAL CAMERA

BACKGROUND OF THE INVENTION

1. Field of the Invention

The present invention relates to a character location method. It also relates to character location in an image from a digital camera with a minimized use of computing power. More specifically the invention relates to a simple and robust connected component based scene character location algorithm for digital images.

2. Description of the Prior Art

Characters as descriptors are key objects in such fields as images or video databases, etc. It is ubiquitous in marks, indicators, billboards, video sequences, text documents, and so on. Thus character extraction and recognition are very important, and have many applications. For example, usability of information devices like a mobile phone is going to be more powerful with the help of optical character recognition (OCR) technology. Video sequences can be labeled or indexed automatically based on the recognized characters presented in a frame or a few frames. However, character location and extraction from images, especially scene images has proved to be difficult, due to the following reasons.

First, the characters are embedded in an image with other objects, such as structural bars, company logos and smears.

Second, the characters may be painted or printed in any color, and the background color may differ only slightly from that of the characters.

Third, the font, size and format of the characters may be different; and lastly, the lighting may be uneven.

Previous efforts to solve these problems are described in: S. Antani, et al. Robust extraction of text in video. Proceedings of IEEE 15th International Conference on Pattern Recognition. 831-834. In this article S. Antani, et al. take advantage of the temporal redundancy in video to detect and extract an unconstrained variety of text from general purpose video. This was done, by combining sub-pixel interpolation on individual frames, multiframe integration across time, character extraction filtering and recognition-based character segmentation.

Another effort to solve these problems is described in Yu Zhang, et al. Automatical caption localization in compressed video. IEEE Transactions on PAMI. 22(4): 385-392, 2000. On the basis of the intensity variation information encoded in the discrete cosine transform (DCT) domain, Yu Zhang, et al, presents a fast text captions method in JPEG compressed images and I-frames of MPEG compressed videos.

But most of the above mentioned efforts are focused on limited characters or controllable background. All the above approaches for pattern recognition algorithms have in common the requirement of substantial computing power. Therefore, they are not suitable for the use with mobile devices such as mobile terminal devices, mobile cameras, mobile phones, or handheld computers, due to low computing power, or low battery capacity.

SUMMARY OF THE INVENTION

The present invention provides a robust character location method in scene images with complex background, which can be used as a part of an OCR system, region of interest (ROI) based visual transmission system, etc.

The present invention decreases the required computing power, for speeding up the character location method.

The present invention decreases the required computing power, which decreases power consumption of the character location algorithm to enable mobile devices to execute the method.

According to a first aspect of the present invention, a method is provided for locating characters in digital images, using an image layering process. The method has the steps of first transforming the digital data of the digital image into normalized digital color image data and into digital grayscale image data, followed by discarding redundant components of the normalized digital color image data and normalized color image data. Then binary image layers from the non-discarded grayscale and normalized color image data are generated according to a layering process, followed by recognizing connected components that can represent characters in the binary image layers.

The method primarily utilizes four different principles for character location: first normalized color spaces, second the discarding of redundant elements in the color space, third a color layering process and fourth an algorithm to recognize connected components in the respective color layers. Thereby it is not important which color space is used. The fact that the human eye can only detect light with a wavelength between approximately 390 and 770 nm should not lead to the restriction of a vision system to this restricted range of wavelengths. This method can be applied to every wavelength range and every color space applicable to image systems. The principles of the invention can be applied to images from infrared (IR) or ultra violet (UV) cameras, as long as these images are "color" images. The selected color space can be a three component based color space like red blue green (RGB), hue saturation intensity (HSI), cyan magenta yellow (CMY), cyan magenta yellow black (CMYB), commission illumination d'eclairage (CIE), YIQ and so on. Even alternative multi-component color spaces can be used for the invention, which can comprise a range of wavelengths that are invisible for the human eye. The key feature of the present invention is to use the data of a digitized color image, transform the color data of the image into a normalized color space and discard redundant elements of the resulting set of data. The normalized color data are independent from shadows in the image, and the dimension of the color space can be reduced by at least one. The method may even discard the grayscale image data, if the image data contains only redundant data. The method may further comprise an additional step to check the normalized color data, if the color space can be reduced by an additional dimension, e.g., if a histogram comprises no detectable extremas, or a layering algorithm detects only one layer.

It is to be noted, that the method can also be used with black and white images. It is not important if the digital image is in a color image format or in a grayscale image format. The method may comprise an additional step to check the image format and to skip the color normalization so as to save computation resources. Alternatively, the normalized digital color data are generated and discarded if the algorithm checks the redundancy or the zero information content of the normalized color data. Latest during the layering process, the redundant color layers are discarded, as no layer can be generated from the normalized color data of a black and white image.

In FIG. 2, the method of dimension reduction is described with reference to the RGB color space.

Conveniently, the binary image layers are generated by calculating histograms representing the frequency distribution function of the digital grayscale image data and the normalized digital color image data and generating binary image layers according to extremas present in the calculated histograms.

Color-layering, also called color-clustering, is an important task in image analysis. It is a process of grouping a color image into different layers or clusters. It is noted that all the pixels in each layer should have a homogeneous color.

The method is not limited to histogram based layering algorithms. Any alternative layering algorithm suitable to generate feature related layers can be suitable. One example of a layering process is called color quantization. In this process each component of the image is reduced, e.g., from 256 to fewer levels, e.g., 4. Then different quantized color levels are grouped to get a color layer.

Preferably, the histograms are processed, to remove any noise extrema in the histograms, before generating the binary image layers. The use of the processing of the histograms is described in the description of FIGS. 3 and 4.

Advantageously, the recognition algorithm to recognize connected components utilizes a black adjacency graph (BAG) based algorithm on the binary image layers to recognize connected components (CC) which can represent characters contained in the digital color image.

The method of the invention is not limited to the use of a BAG based algorithm. Any algorithm that searches connected components is suitable, e.g., pixel based object clustering: Mark M W, A lip-tracking system based on morphological processing and block matching techniques, Signal Processing: Image Communication, 1994, 6:335-348.

Advantageously, the upper, lower left, and right borders of the connected components are registered as bounding boxes in the binary image layers. The bounding boxes are depicted, e.g., in the FIG. 6.

Conveniently, the binary image layers are mapped to a single plane.

Preferably, each bounding box is discarded or kept according to predetermined size values and positions of the bounding box in the binary image layers or the single plane. According to features of bounding boxes, connected components (CC) or characters, those CCs with too large area or linked to the border of the analyzed image can be deleted. It is noted that no consideration of the CCs linked to the border of the image is reasonable, even though the CCs might be characters or parts of characters, because observers may be more interested in the characters existing in centers of images. The CCs linked to the border might be only a section of a character or of a row of characters, so that a possible subsequent character recognition algorithm or aligning and merging analysis method may produce false results.

Advantageously, the bounding boxes are subjected to an alignment and merging analysis (AMA) method, to define size and position relations of the bounding boxes, to merge different bounding boxes and to discard all bounding boxes that are not related in size and/or position. The AMA method is described in FIG. 6. In the figure, each box marked by a number stands for a connected component (CC) box or bounding box, which is possible to be a whole character or one part of a character. The connected component seed (CCS) gives the size of potential characters to be located. After the AMA, the algorithm can locate four classes of potential characters, i.e., whole characters, merged characters, slim characters, and narrow characters, for example, characters "王" and "玨" are a whole and merged characters respectively, but "—" is a narrow character, number "1" or capital letter "I" is a slim character.

Conveniently, the contents of the bounding boxes are subjected to an identification of character region algorithm, to determine, if the bounding box contains a character or not. For a detailed description of an example of a character identification algorithm refer to FIG. 7.

Preferably, the digitized color image data are preprocessed before they are transformed into the normalized digital color data. The preprocessing of the image data can be used to delete erroneous components or noise.

Advantageously, preprocessing is executed by means of a weighted median filter based anisotropic diffusion (WM-FAD) method. The WMFAD method can be used to remove noise in the input color scene images from camera. It can be extended to color images. It not only possesses the advantages of the traditional anisotropic diffusion (TAD) method, but also effectively removes small scale features with high contrast, say smears in natural scene. The principles of the TAD and WMFAD method are depicted and described in FIG. 1.

According to another aspect of the present invention, a computer program for carrying out the method for character location in images is provided, which comprises program coding for performing all of the steps of the preceding description when the program is run on a computer or a network device.

According to yet another aspect of the invention, a computer program product is provided comprising program coding stored on a computer readable medium for carrying out the method for character location in images of the preceding description when the program product is run on a computer or a network device.

Preferably, the device of the invention is a mobile terminal. The mobile terminal can be incorporated in other devices like a mobile telephone, to offer, e.g., additional features. For instance a mobile telephone with an incorporated camera can use a character location feature according to the invention to generate, e.g., a FAX or a SM (short message) from a written text. With the use of a camera the mobile terminal device will not need to incorporate a built in or separate scanner slot. Additionally, such a mobile telephone can be built very small. To improve such an optical character recognition (OCR)-/scanner-function, the mobile device may incorporate at least one laser diode, to visualize a selected section on the scanned object. The beam from the laser diode may be utilized to provide an "autofocus"-function to the optical system of the mobile device.

BRIEF DESCRIPTION OF THE DRAWINGS

In the following, the invention will be described in detail by referring to the enclosed drawings in which.

DESCRIPTION OF PREFERRED EMBODIMENTS OF THE INVENTION

Figure 1:
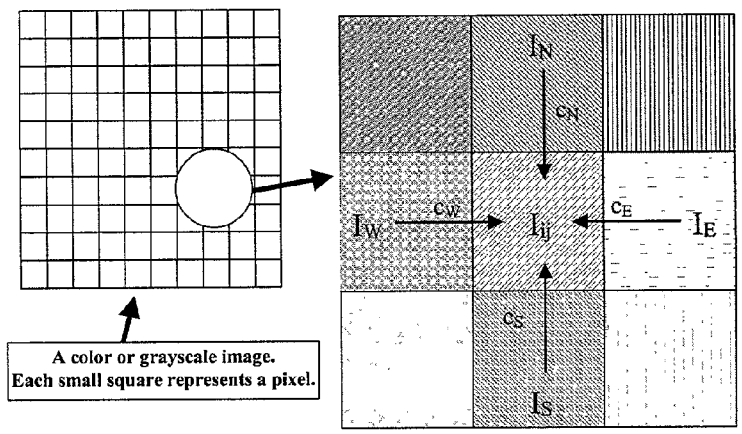
FIG. 1 describes a TAD preprocessing method.

FIG. 1 describes the TAD method for smoothing inferences in the digital color image. Any scene images from a digital camera are completely noise-contaminated. There are two main kinds of noise, the one is stochastic noise mainly caused by the camera itself, the other is pepper-salt noise due to smears in natural scene. Before color layering of images, noise should be removed as much as possible, otherwise, good color layering results may not be obtained. One way to reduce the salt and pepper noise is to use an anisotropic diffusion on scene images. The 4-connected, discrete approximation of the traditional anisotropic diffusion (TAD) is implemented by $$I(t+1) = I(t) + \lambda \sum_D c_D \nabla_D I(t) \quad D \in \{N, E, S, W\} \quad (1)$$

where $\nabla$ is a gradient operator. $c_D = e^{-(\nabla_D I/K)^2}$ (K is a constant), is the conduction coefficient, which is space-varying, and $c_D$ is chosen to be large in homogeneous regions to encourage smoothing, and small at edges to preserve structure (FIG. 1). Basing the anisotropic diffusion coefficient completely on local gradients does create a filter capable of smoothing an image while maintaining edge locality. However, it is impossible to remove small scale features with high contrast. This property makes anisotropic diffusion unsuitable for the removal of some specific noise, say pepper-salt noise. To solve the problem, a weighted median filter based anisotropic diffusion (WMFAD) method is used, and extended to color images.

The intensity component Y is computed, then filtered using a weighted median filter to get median (Y).

The anisotropic diffusion coefficient is computed based on median (Y). Based on the same conduction coefficient, the anisotropic diffusion process is imposed on the components of the color image, e.g., the three R, G, B components of the color image respectively and the smoothed color image respectively.

Substituting a new nonlinear conduction coefficient for (1) results in the WMFAD method: $c_D = e^{-(\nabla_D median(Y)/K)^2}$ where Y is the illumination component of the processed color image; median (Y) is the result of the weighted median filtering to Y by the mask:

$$\begin{bmatrix} 1 & 1 & 1 \\ 1 & 3 & 1 \\ 1 & 1 & 1 \end{bmatrix}$$

Imposing the WMFAD method on the components, e.g., the three components (red, green and blue), of the color image respectively, i.e., let $I \in \{R, G, B\}$, implements the preprocessing of the color image.

Figure 2:
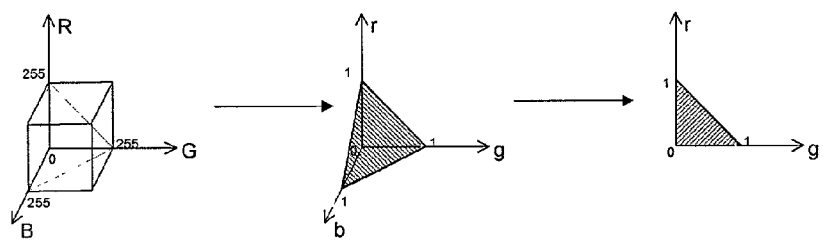
FIG. 2 depicts the dimension reduction of the color space due to the use of a normalized color space.

FIG. 2 depicts the dimension reduction of the color space due to the use of a normalized color space. Color-layering, also called color-clustering, is an important task in image analysis. It is a process of grouping a color image into different layers or clusters. All the pixels in each layer should have a homogeneous color. In order to facilitate character detection in scene images, the character location method uses a color layering method to cluster all pixels in a scene image. As a result, characters and the background are grouped into different layers respectively.

The different color spaces in use today include: red blue green (RGB), normalized RGB (rgb), hue saturation intensity (HSI), cyan magenta yellow (CMY), cyan magenta yellow black (CMYB), commission illumination d'eclairage (CIE), YIQ and so on. But RGB, normalized RGB (rgb), and HIS color spaces are often used. RGB space is a basic color one. Each of the components in the RGB space can be gotten directly from BITMAP image format, and they are highly correlated and not independent of each other. HSI space is remarkably popular in view of human color perception. HSI space characterizes color in terms of hue, saturation and intensity components, a typical definition is given by:

$$\left. \begin{array}{l} int = \dfrac{(R+G+B)}{3} \\ sat = 1 - \dfrac{\min(R, G, B)}{int} \\ hue = \arctan\left[\dfrac{\sqrt{3}\,(G-B)}{(R-G)+(R-B)}\right] \end{array} \right\}$$

Thereby, arctan(y/x) utilizes the signs of both y and x to determine the quadrant in which the resulting angle lies. Generally, hue is thought of as the angle between a reference line and the color point in the RGB space. However, the nonlinear transform from RGB ton HSI has an unfortunate property of an unremovable singularity at the axis of the HSI color cylinder, where R=G=B (saturation=0), which results in the calculation of inconvenience. The normalized RGB (rgb) also stems from the RGB space. Its transform formula is:

$$(r, g, b) = \begin{cases} (0, 0, 0) & \text{if } k = 0 \\ \left(\dfrac{R}{k}, \dfrac{G}{k}, \dfrac{B}{k}\right) = \left(\dfrac{R}{k}, \dfrac{G}{k}, 1-r-g\right) & \text{if } k > 0 \end{cases} \quad \text{where } k = R+G+B$$

From the above transformation formula, it can be noticed, that one in the r, g, b three components is redundant, i.e., any two of the three components can describe the whole color space. Therefore, the transformation compresses color information from three dimensions to two dimensions (as shown in FIG. 2), which is useful to color space processing. From the view of image processing, though the normalized RGB (rgb) space is not in accordance with human vision perception, it can weaken the effect of lighting. FIG. 2 shows the transformation from the 3D RGB space via a 2D rgb plane to a 2D rg plane. In FIG. 2, the normalized RGB (rgb) space is used as the color layering space. It is apparent, that this principle can be applied to any color space. Further it is apparent, that instead of the rg-plane any other color plane, e.g., the gb or the rb-plane can be selected.

Figure 3:
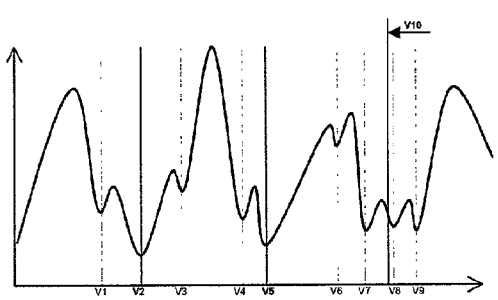
FIGS. 3 & 4 are examples for a histogram extrema reduction method in the color layering process.
Figure 4:
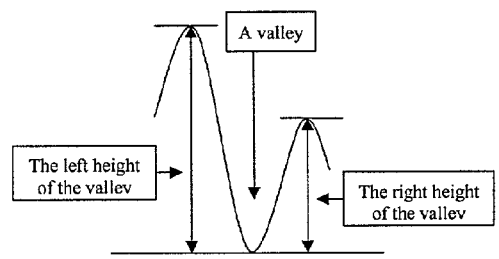

FIGS. 3 and 4 depict a principle histogram-based color layering algorithm. For a grayscale image composed of the regions with gentle changes, the regions of the image often correspond to the peaks of its histogram. If these peaks are detected and segmented accurately, the regions of the image can be segmented successfully by the corresponding valleys or peaks. But in real life, any image is polluted by noise. Noise always contributes to noise peaks overlapped on real peaks, which make image segmentation unreliable. FIG. 3 shows a histogram of an image. By the histogram, the image is actually composed of four regions with gentle changes, but due to the noise distortion, nine valleys V1 to V9 (ten peaks) are detected to locate in the histogram. If the image is layered by the nine valleys, ten layers, not four layers, are gotten. FIG. 3 is a histogram in which the noise extrema are overlapped on the real ones of a valley. FIG. 4 is a description of the left and right height of a valley. Many techniques for removal of noise extrema have been developed so far, such as fingerprint-based scale space filtering strategy. But in this paper, a simple but robust algorithm for the task is presented.

The algorithm is classified into four steps as follows (refer to FIG. 3):

Step 1: Initialization. The left and right heights for each valley are computed (shown as FIG. 3). A threshold is set for the left and right heights of valleys.

Step 2: Removal of noise valleys. Any valley, whose left and right height are both less than the set threshold, will be removed, like V6 and V8. This kind of noise valleys are defined as the first class of noise valleys. Any valley, whose left or right height (as depicted in FIG. 4) is less than the set threshold, will be removed, like V1, V3, V4, V7 and V9. This kind of noise valleys can be defined as the second class of noise valleys.

Step 3: Generation of new valleys. If there are one or more noise valleys of the first class (no other valley(s)) between any two noise valleys of the second class, a new valley, located in the middle of the two noise valleys of the second class, will be generated, like V10.

Step 4: The end. The rest of the valleys (like V2 and V5) and the new generated valley(s) (like V10) are regarded as the real ones for image layering.

It is noted that the new generated valley(s) might not be accurate, but does not affect the layering result significantly. Additionally, it has to be noted, that an analogous algorithm can be used to smoothen the histogram by reducing the number of peaks in the histogram.

Figure 5:
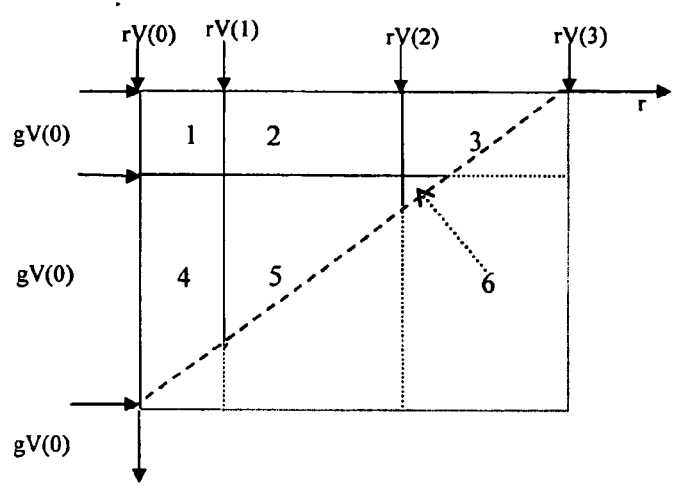
FIG. 5 depicts the principles of the generation of binary layers from the information contained in the histogram extremas.

FIG. 5 depicts the principles of the generation of binary layers from the information contained in the histogram extremas. On basis of the above description histogram generation and extrema reducing method, the explanation of color layering becomes simple. For any color image, its normalized components, e.g., normalized RGB (r, g, b) need to be computed first. In fact, only two components are needed, here the r and g components are chosen. Then the r's and g's histograms are counted respectively. Finally, by applying the above noise-extrema-removal procedure to each of the two histograms, the color image can be grouped into several clusters (called color layers) by:

$$\text{cluster}(u) = \sum_{r=rV(m)}^{rV(m+1)} r(x,y) \cap \sum_{g=gV(m)}^{gV(n+1)} g(x,y)$$

Thereby, x and y are the row and column of the image, u is an index for grouped layers or clusters, "∩" is the logical AND operator. FIG. 5 shows an example which there are two valleys for the r component and only one valley for the g component, so the color image is grouped into six layers (each rectangle stands for a layer or cluster). However, the rectangle which contains few pixels can not be considered as a valid layer. In an additional step of the algorithm, the number of pixels in a layer can be checked relatively to an absolute or relative threshold. The rectangle or the respective layer can be discarded if being below the threshold. Alternatively, the number of pixels contained in each rectangle is counted and only rectangles in which the counted number of pixels is larger than a predetermined threshold are declared as valid layers. In FIG. 5 the normalized color plane is grouped by the valleys. It is possible to define a layer by a maximum of a peak and according to, e.g., the coordinates of the half width values of the peak. It is possible to define a layer also by a maximum of a peak and according to, e.g., half the distance to the adjacent peaks. It is worth stressing here that a good layering result might not be obtained under the condition that characters (foreground) and background are all of gray, for instance, characters are black while the background is white, because different grays have the same normalized color, i.e., $r=\frac{1}{3}$, $g=\frac{1}{3}$. However, their intensities are usually quite different. As reinforcement, the grayscale image transformed from the corresponding color image is layered with reference to the valleys in its gray histogram. For the sake of convenience all these gray layers and color layers are named binary layers. After the layering operation, a color image is grouped into different color layers. In fact, each layer is a binary image, which means that each pixel of each binary layer has an information content of 1 bit, e.g., the pixels of the binary layers are black or white.

Figure 6:
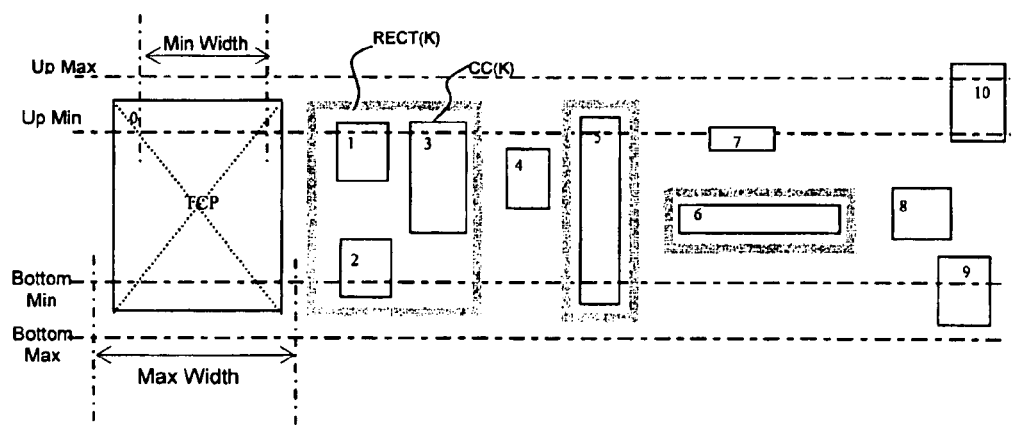
FIG. 6 depicts the principles of a connected component based alignment and merging analysis (AMA) method.

FIG. 6 depicts the principles of a connected component based alignment and merging analysis (AMA) method. After the layering operation, a color image is grouped into different binary layers. In fact, each binary layer is a binary image like the dot matrix depicted in FIG. 7. In order to detect potential characters, analysis of each connected black region (also called connected component) in the color layer is necessary. A common analysis approach is based on Black Adjacency Graph (BAG). The analyzed binary image is presented as a BAG. BAG-based CC analysis can preserve both shape and structure information of each CC at a low cost in computation. The result of the BAG-based CC analysis is a list of connected components (CCs) for each color layer. The upper, lower, left and right borders of each CC can be registered. According to features of characters, those CCs with too large area or linked to the border of the analyzed image should be deleted first. It is noted that no consideration for the CCs linked to the border of the image is reasonable, even though they might be characters or parts of characters, because observers are often more interested in the characters existed in center region of images. Sometimes, the bounding boxes of some CCs are connected to each other, each of them is one part of the same character (assumed that they constitute a character), so it can be useful to merge these CCs by the condition:

$$\frac{S}{\min(S_1, S_2)} > Th_1.$$

S1 and S2 are the areas of two connected CC bounding boxes respectively, and S is their overlapping area. Th1 is a predetermined or calculated absolute or relative threshold. The two CC bounding boxes are merged to produce a new merged bounding box, for simplicity, it was also regarded as a CC bounding box. At last, the CCs with too small area are deleted. In many languages, especially Chinese and Japanese, characters are normally composed of one or more strokes, and the different strokes, which constitute one character, often are not connected to each other. So one character often includes more than one CC bounding box. In each color layer, some neighbor CCs need to be properly merged to get an unabridged character. If any two neighbor characters are far between, the CCs can be correctly merged to get the whole characters via some distance thresholds set by the location or size relation amongst the CCs. But if any two neighbor characters are very close between, the above simple merging scheme can not be used to get a good result.

However, in real world situations characters are presented as rows or columns intuitively, and the characters, which are aligned in a row or column, have a similar size. The following robust Aligning and Merging Analysis (AMA) method utilizes these two typical features.

To the aligning and merging analysis in color layers, it is key to select correct connected component seeds CCSs. Once the CCSs are selected, they will be regarded as reference, other potential characters in the color layer can be hunt out by the characters' size and their alignment relation. If a CC is a whole character, its height (CCH) and width (CCW) should meet the formulas:

$$\frac{CCW}{CCH} > Th_3 \quad \frac{CCH}{CCW} > Th_2$$

Wherein $Th_2$ and $Th_3$ are predetermined or calculated absolute or relative thresholds. For Chinese or Japanese characters $Th_2$ and $Th_3$ can be equal.

In each color layer, the CCs which meet the preceding formulas can be defined as CCSs. These CCSs are regarded as the default potential characters, and any other CCs may only be parts of possible characters.

The AMA method consists of two parts: Row Analysis and Column Analysis. As the two kinds of analysis are similar in methodology, only the detail of the row analysis is given. In one color layer, the location of each CC(k) is registered by the bounding box RECT(K) (as shown in FIG. 6). During the AMA row analysis, with every CCS as reference, the potential characters in the left and right sides of the CCS are searched out respectively by some rules, such as the alignment to the CCS, the range defined by the CCS, etc, then from left to right in the CCS row, all the searched candidates (including the CCS) are rearranged to register. The number of the candidates is distributed to every candidate as its row alignment value.

A possible embodiment of the AMA Row Analysis can be described as follows referring to FIG. 6:

(A) In each color layer, the center point (CP) of each CC is computed (only depicted for the bounding Box 1);

(B) With reference to a CCS(k), the range of the potential characters is decided by the conditions:

Up_Max=RECT($k$,Up)−$k1$*RECT($k$,Height),

Up_Min=RECT($k$,Up)+$k1$*RECT($k$,Height),

Bottom_Max=RECT($k$,Bottom)+$k1$*RECT($k$,Height),

Bottom_Min=RECT($k$,Bottom)−$k1$*RECT($k$,Height),

Max_Width=(1+$k2$)*RECT($k$,Width),

Min_Width=(1−$k2$)*RECT($k$,Width), (0<$k1$,$k2$<0.5);

(C) From RECT(k, Right) to the right border of the image, Up_Max to Bottom_Max, all CC boxes, whose center points are located in the area, are searched. Assumed that their center points are CP(i), i=0, 1, 2, . . . , n. Let i be 1, the aligning and merging analysis process is commencing;

(D) The RECT(i), whose center point is CP(i), is input;

(E) If the RECT(i) meets the conditions:

Up_Max<RECT($i$,Up)<Up_Min,

Bottom_Min<RECT($i$,Bottom)<Bottom_Max,

Min_Width<RECT($i$,Width)<Max_Width, then the CC(RECT(i)) is registered as a whole potential character, i is increased by one, turn to (D), the next candidate is going to be searched; or turn to (F);

(F) RECT(i) and RECT(i+1) are merged to get the merged bounding box MRECT(i, i+1);

(G) If MRECT(i, i+1) satisfies one of the following conditions:

MRECT($i$,$i$+1,Up)<Up_Max,

MRECT($i$,$i$+1,Bottom)>Bottom_Max,

MRECT($i$,$i$+1,Width)>Max_Width, then turn to (H); if MRECT(i, i+1) satisfies the conditions:

Up_Max<MRECT($i$,$i$+1,UP)<Up_Min,

Bottom_Min<MRECT($i$,$i$+1,Bottom)<Bottom_Max,

Min_Width<MRECT($i$,$i$+1,Width)<Max_Width, then MRECT(i, i+1) is a merged potential character. After i is increased by one, turn to (D), the next candidate is going to be searched; or let RECT(i+1)←MRECT(i, i+1), After i is increased by one, turn to (F), continue to merge the subsequent CC box;

(H) In the merged bounding box MRECT(i, i+1), if there is a CC box RECT(x), which meets the conditions:

Up_Max<RECT($x$,Up)<Up_Min,

Bottom_Min<RECT($x$,Bottom)<Bottom_Max,

RECT($x$,Width)<3*RECT($x$,Height), then the CC is a slim potential character, such as number "1", English letter "I", and so on; if the bounding box RECT(x) meets the conditions:

Up_Min<RECT($i$,Up),RECT($i$,Bottom)<Bottom_Min,

Min_Width<RECT($i$,Width)<Max_Width,

RECT($i$,Height)<3*RECT($i$,Width), then the CC is a narrow potential character, for instance the character "—". If i=n, turn to (I), if not, turn to (D) and the next candidate is going to be searched;

(I) The above method is adopted to analyze all the CC bounding boxes located in the left side of the CCS bounding box, some potential characters might be also gotten. All the potential characters (including the CCS) need to be arranged from left to right, and the number of the potential characters is counted. The number is the row alignment value of the potential characters;

(J) If the AMA row analysis of every CCS in the CC layer is finished, exit the row analysis process of the color layer; otherwise, turn to (b), commence the AMA row analysis of the new CCS bounding box. As in FIG. 6, the No. 0 bounding box is registered as a CCS. After its AMA row analysis, a merged potential character (composed of the No. 1, 2, 3 boxes), a slim potential character (composed of the No. 5 box) and a narrow potential character (composed of the No. 6 box) can be searched. Their alignment values are 4. The rest of the boxes (No. 4, 7, 8, 9, 10) are not characters or parts of characters. The AMA column analysis is similar to its row analysis. The unique difference consists in the distribution of the alignment values of the potential characters. If a potential character is distributed with an alignment value ALIGN1 after its AMA row analysis, and the ALIGN2 potential characters are searched in the potential character column after its column analysis, the alignment value of the potential character is not ALIGN2 but the bigger between ALIGN1 and ALIGN2.

After the AMA analysis, each potential character in a binary layer thereof has an alignment value. Before the identification of all the potential characters, the pre-selection on the potential characters can be imposed to discard some character false alarms.

First, if the box areas of two potential characters and their overlapping area are S1, S2 and S respectively, and they meet:

$$\frac{S}{\min(S_1, S_2)} > k_4$$

($k_4$ is a certain threshold), the potential character with the smaller alignment value should be discarded.

Second, if a potential character, whose alignment value is only one, is isolated, the potential character should be discarded and on the other hand, if a potential character with an alignment value of one connects with other characters whose alignment values are more than one, the potential character should be kept.

It should be noted, that the rows and columns used in the AMA can be sewed or inclined to compensate faulty adjustment of the camera, vanishing line effects, and optical distortions.

Figure 7:
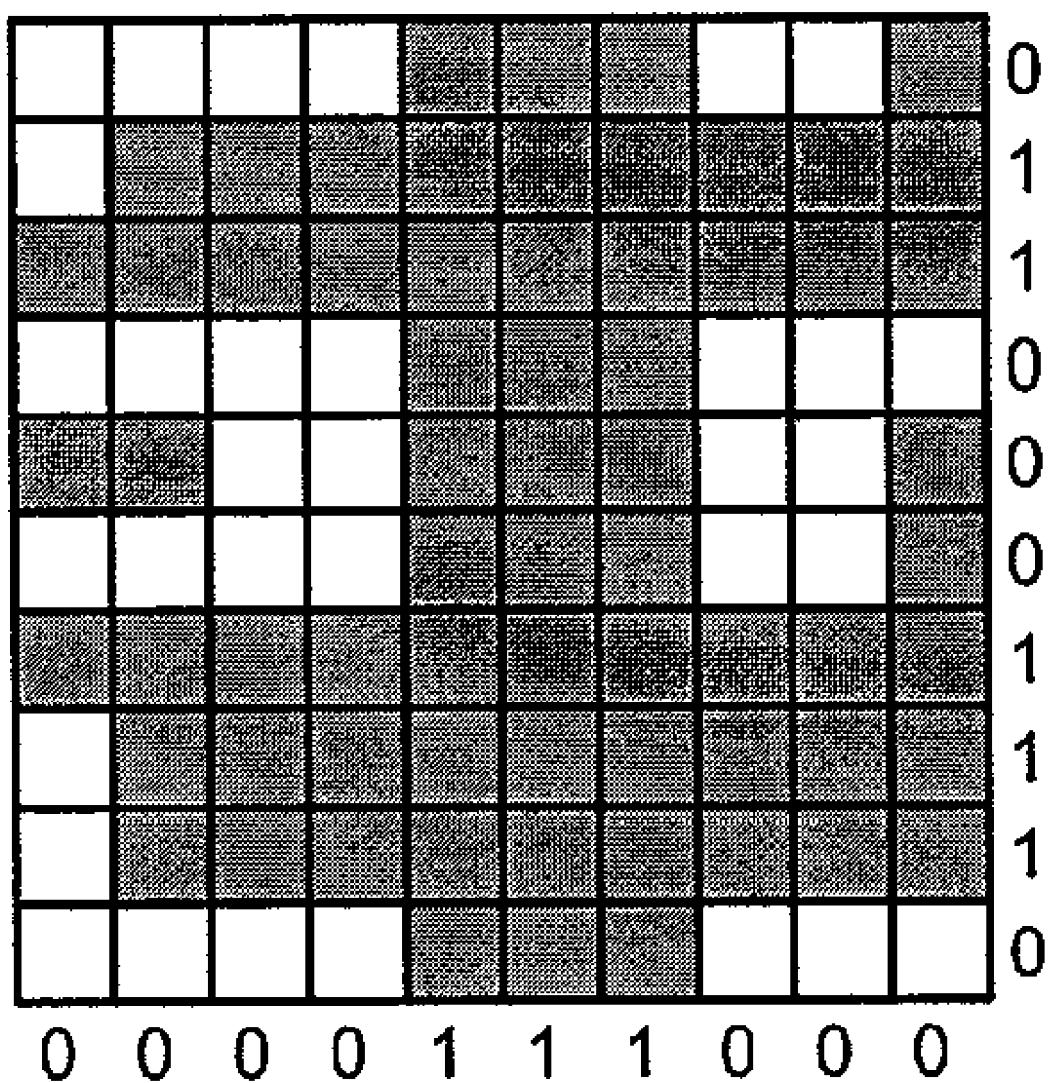
FIG. 7 is an example for an identification of character regions.

FIG. 7 is an example for an identification of character regions. The identification of character regions analyzes all the potential characters located from the previous stage in order to eliminate character false alarms. A combination of various heuristic techniques can be used to achieve this. The following criteria are successively applied:

(1) If the candidate region does include a character, the region should have enough contrast, i.e., the histogram of the region should have a good bimodal distribution, with two peaks corresponding to the character and its background intensities. A simple means of measuring the contrast is by constructing the cumulative histogram and demarcating two gray-levels, high and low, such that:

low=the gray-level below in which 10% of the total number of pixels lie;

high=the gray-level below in which 90% of the total number of pixels lie.

The difference between high and low can be used simply to check the contrast of the candidate region. In real identification, two thresholds for the contrast of candidate regions can be set. The bigger for the whole and merged potential characters, and the smaller for the slim and narrow potential characters.

(2) The structure of characters, which are composed of one or more strokes, for example, horizontal stroke, vertical, stroke, and etc, can be used to eliminate some character false alarms. If the candidate region has been binarized, the black pixels belong to character, and the white pixels belong to background or vice versa as can be seen in FIG. 7. The region is scanned from left to right, up to down, row by row, all horizontal segments are searched. A horizontal segment is defined as a collection of consecutive black pixels in a row. In each row, if there exists a horizontal segment with length>(⅝)*W (W is the width of the region), the row is marked by 1, or by 0. After the scan is finished, from up to down, the algorithm searches the consecutive rows marked with 1 should not be large, say less than (⅓)*H (H is the height of the character region), in the meantime, there are not many horizontal strokes in one character region if the candidate is genuine. For a narrow character, the number of consecutive rows should be very large comparing to the height of the candidate region, say more than (⅚)*H, because there is only one horizontal stroke in a narrow character. As the same rules, the algorithm can search all the vertical segments in the candidate region. A vertical segment can be defined as a collection of consecutive pixels in a column. Then the similar schemes to the above are used to identify the whole, merged or slim potential characters.

(3) Characters are intuitively aligned as rows or columns. At the stage of the coarse detection of characters, the method uses the AMA algorithm to locate all potential characters in each color layer (as described and depicted in FIG. 6). After the bounding boxes of the potential characters in all color layers are mapped into the same plane, the alignment property of characters should not be changed. At this step, the method uses the aligning scheme of the AMA algorithm to align all the potential characters, and compute their alignment values. If the alignment value of one candidate is just equal to 1, and isolated, it is regarded as a character false alarm.

(4) Character recognition is helpful to eliminate some character false alarms. If a potential character cannot be recognized, it is certainly not a genuine character. At this step, the method uses the recognition distance computed from the character recognition software kit to identify the potential character. The recognition distance describes the similarity between a potential character and genuine characters. The larger the distance is, the more impossible the candidate would be genuine.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A method for locating characters in digital images, using an image layering process comprising:

transforming digital data of the digital images into normalized digital color image data and into digital grayscale image data;

discarding redundant components of the digital grayscale image data;

generating binary image layers from the non-discarded grayscale and normalized color image data according to a layering process; and using a recognition algorithm on the binary image layers to recognize connected components that can represent characters or part of characters contained in the digital images.

2. A method according to claim 1, wherein the binary image layers are generated by calculating histograms, representing a frequency distribution function of the digital grayscale image data and the normalized digital color image data and generating binary image layers according to extremas present in the calculated histograms.

3. A method according to claim 2, wherein the histograms are processed, to remove any noise extrema in the histograms, before generating the binary image layers.

4. A method according to claim 1, wherein the recognition algorithm is a black adjacency graph based algorithm.

5. A method according to claim 2, wherein the recognition algorithm is a black adjacency graph based algorithm.

6. A method according to claim 3, wherein the recognition algorithm is a black adjacency graph based algorithm.

7. A method according to claim 1, wherein upper, lower, left and right borders of the connected components are registered as bounding boxes in the binary image layers.

8. A method according to claim 2, wherein upper, lower, left and right borders of the connected components are registered as bounding boxes in the binary image layers.

9. A method according to claim 3, wherein upper, lower, left and right borders of the connected components are registered as bounding boxes in the binary image layers.

10. A method according to claim 4, wherein upper, lower, left and right borders of the connected components are registered as bounding boxes in the binary image layers.

11. A method according to claim 5, wherein upper, lower, left and right borders of the connected components are registered as bounding boxes in the binary image layers.

12. A method according to claim 6, wherein upper, lower, left and right borders of the connected components are registered as bounding boxes in the binary image layers.

13. A method according to claim 1, wherein the binary image layers are mapped to a single plane.

14. A method according to claim 2, wherein the binary image layers are mapped to a single plane.

15. A method according to claim 3, wherein the binary image layers are mapped to a single plane.

16. A method according to claim 4, wherein the binary image layers are mapped to a single plane.

17. A method according to claim 7, wherein the binary image layers are mapped to a single plane.

18. A method according to claim 7, wherein each bounding box is discarded or kept according to predetermined size values and positions of the bounding box the binary image layers or the single plane.

19. A method according to claim 7, wherein the bounding boxes are subjected to an alignment and merging analysis method, to define size and position relations of the bounding boxes, to merge different bounding boxes and to discard all bounding boxes that are not related in size and/or position.

20. A method according to claim 17, wherein the bounding boxes are subjected to en alignment and merging analysis method, to define size and position relations of the bounding boxes, to merge different bounding boxes and to discard all bounding boxes that are not related in size and/or position.

21. A method according to claim 18, wherein the bounding boxes are subjected to an alignment and merging analysis method, to define size and position relations of the bounding boxes, to merge different bounding boxes and to discard all bounding boxes that are not related in size and/or position.

22. A method according to claim 7, wherein contents of the bounding boxes are processed with an identification of character region algorithm, to determine, if the bounding box contains a character or not.

23. A method according to claim 17, wherein contents of the bounding boxes are processed with an identification of character region algorithm, to determine, if the bounding box contains a character or not.

24. A method according to claim 18, wherein contents of the bounding boxes are processed with an identification of character region algorithm, to determine, if the bounding box contains a character or not.

25. A method according to claim 19, wherein contents of the bounding boxes are processed with an identification of character region algorithm, to determine, if the bounding box contains a character or not.

26. A method according to claim 1, comprising preprocessing the digital data before transforming thereof into the normalized digital color data and into the digital grayscale image data.

27. A method according to claim 26, wherein the preprocessing is a weighted median filter based anisotropic diffusion (WMFAD) method.

28. A computer program for executing a method for locating characters in images, comprising program coding encoded on a computer-readable medium for carrying out the steps of claim 1, when the program is run on a computer, a network device, a mobile terminal, or a camera device.

29. A computer program product comprising program coding stored on a computer readable medium for carrying out the method of claim 1, when the program product is run on a computer, a network device, a mobile terminal, or a camera device.

30. A device for executing a method according to claim 1.

31. A device according to claim 30, wherein the device is a mobile terminal.

32. The method of claim 1, wherein the use of the recognition algorithm includes, for each binary image layer:
   selecting connected component seeds to be used as default potential characters from available connected components, the selected connected component seeds meeting predefined criteria; and
   using an alignment and merging analysis (AMA) method to identify potential characters, the alignment and merging analysis method using the selected connected component seeds as a reference.

33. The method of claim 32, wherein the predefined criteria comprises a connected component satisfying both $$\frac{CCW}{CCH} \rangle T_{h3} \text{ and } \frac{CCH}{CCW} \rangle T_{h2},$$

wherein $T_{h2}$ and $T_{h3}$ are predetermined or calculated thresholds, CCW is the width of the connected component, and CCH is the height of the connected component.

34. The method of claim 32, wherein the alignment and analysis method comprises an AMA row analysis and an AMA column analysis.

35. The method of claim 32, wherein use of the recognition algorithm includes analyzing the identified potential characters to eliminate false characters.

* * * * *